(12) United States Patent
Parnell

(10) Patent No.: US 7,950,708 B2
(45) Date of Patent: May 31, 2011

(54) PROGRAMMABLE ZONED END EFFECTOR

(75) Inventor: Geoffrey James Parnell, Moseley, VA (US)

(73) Assignee: AMF Automation Technologies, Inc., Richmond, VA (US)

( * ) Notice: Subject to any disclaimer, the term of this patent is extended or adjusted under 35 U.S.C. 154(b) by 418 days.

(21) Appl. No.: 12/192,184

(22) Filed: Aug. 15, 2008

(65) Prior Publication Data

US 2010/0040450 A1 Feb. 18, 2010

(51) Int. Cl.
*A47G 21/10* (2006.01)

(52) U.S. Cl. .................... 294/2; 294/65; 901/40

(58) Field of Classification Search ............ 294/2, 64.1, 294/64.2, 65; 901/40; 414/627, 404, 737, 414/752, 752.1; 251/61, 61.2, 63.5
See application file for complete search history.

(56) References Cited

U.S. PATENT DOCUMENTS

| | | | |
|---|---|---|---|
| 4,078,671 A | 3/1978 | Lundstrom | |
| 4,355,936 A | 10/1982 | Thomas et al. | |
| 4,787,812 A | 11/1988 | Gopfert | |
| 4,850,627 A | 7/1989 | Franklin | |
| 5,024,575 A | 6/1991 | Anderson | |
| 5,088,878 A | 2/1992 | Focke et al. | |
| 5,387,068 A * | 2/1995 | Pearson | 414/404 |
| 5,609,377 A * | 3/1997 | Tanaka | 294/65 |
| 5,752,729 A | 5/1998 | Crozier et al. | |
| 5,813,713 A | 9/1998 | Van Den Bergh | |
| 6,860,531 B2 | 3/2005 | Sherwin | |
| 7,000,964 B1 * | 2/2006 | Porras et al. | 294/64.1 |
| 7,017,961 B1 | 3/2006 | Parnell et al. | |
| 7,134,833 B2 * | 11/2006 | de Koning | 414/753.1 |
| 7,481,472 B2 * | 1/2009 | Cawley et al. | 294/2 |
| 7,648,182 B2 * | 1/2010 | Salimkhan | 294/65 |
| 7,828,351 B2 * | 11/2010 | Baumstimler | 294/2 |

OTHER PUBLICATIONS

"M-420iA/M-421iA, Fanuc Robotico" Brochure 2007, 10 pages.

* cited by examiner

*Primary Examiner* — Saúl J Rodríguez
*Assistant Examiner* — Stephen Vu
(74) *Attorney, Agent, or Firm* — Thomas, Kayden, Horstemeyer & Risley, LLP

(57) ABSTRACT

An end effector for a robot having an array of suction cups includes an air control valve connected to each suction cup. Each valve can be individually operated so that specific zones of suction cups may be activated while others are dormant. The dormant suction cups are closed to the sub-atmospheric pressure, so that leakage of air through unused suction cups is avoided, while only the suction cups of the selected zone perform the picking of the work products. This allows the end effector to provide accurate and constant sub-atmospheric pressure to the work products during the picking process.

16 Claims, 10 Drawing Sheets

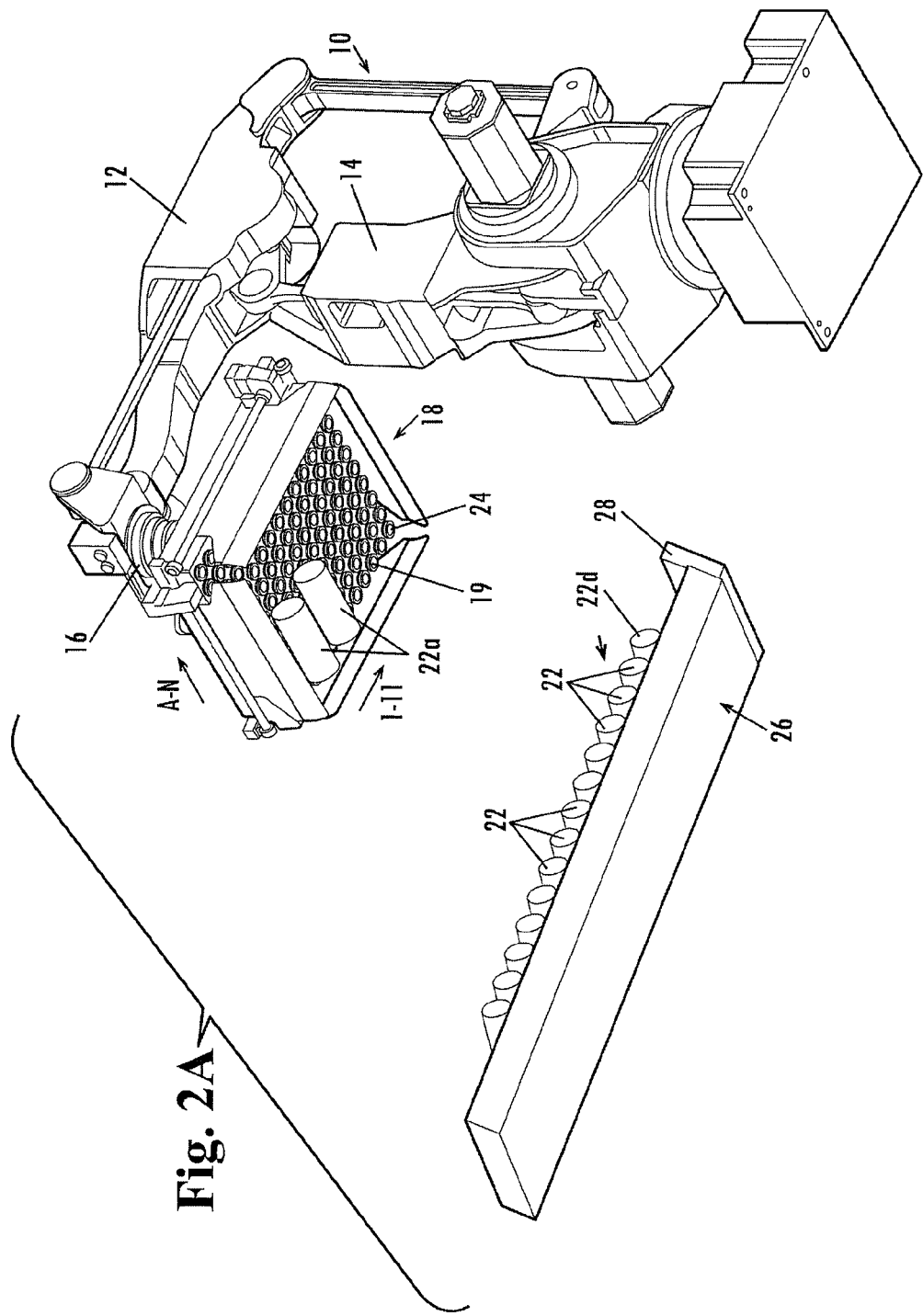

PROGRAMMABLE ZONED END EFFECTOR

TECHNICAL FIELD

The present disclosure concerns packaging equipment and, more particularly, concerns a robotic packaging apparatus that includes an end effector for collecting work products of different shapes and sizes in different patterns for delivery to a receptacle, such as to a shipping container.

BACKGROUND OF THE DISCLOSURE

In robotic packaging operations, a producer might desire to ship work products in shipping containers of a standard shape and size. The shape and size of the individual work products might be different from one job to the next. In order to ship in standard size containers it may be required to retrieve and collect the products of one size and shape on the end effector of the robot in a different pattern than for other products.

For example, in the bakery industry a producer typically will produce several sizes of loaves of bread from time to time and has one basket size in which he/she ships the products. The different products may fit best in the basket when configured in different arrangements or pack patterns than other sized products. The pack patterns are dependent of the product sizes. A robot may be used to pick the products up with multiple picks of the end effector at various positions to form the desired pattern of the products on the end effector, and the robot then places the products into the basket all at once in the desired pattern.

Usually a single vacuum source with high flow and low vacuum level for the pick-up force is desirable and most commonly used. Multiple suction cups typically are used as the vacuum retrievers to provide the seal between the vacuum source and the objects being picked. When multiple picks are required for one delivery of the products to the basket, the vacuum must be applied to certain suction cups on the end effector to enable picking or holding of the product in that pick zone while other zones of the suction surface must not allow vacuum flow because those zones of the end effector are not yet covered by work products. To accomplish this, the vacuum source may be split in several tubes and then the tubes are valved open or closed to allow vacuum to flow to different sectioned-off portions of the suction surface of the end effector.

The system described above is not ideal when several different zones are required to conduct the picking functions and/or the zones must change in shape for picking different products. If there are too many pick zones of vacuum retrievers then the vacuum lines become small and restrict the vacuum flow.

A common solution was to provide multiple end effectors that have 2 to 6 pick zones in the suction surface strategically placed for the specific pattern or similar patterns that it is designed for. This is cost prohibitive as some producers have dozens of different shaped and sized products and would require dozens of different end effectors.

Similarly, another method of having a non-zoned end effector was to have the vacuum source connected with a large hose to a large plenum. The bottom of the plenum is then populated with multiple suction cups that allow high flow between the cup and the plenum. This may be a solution to some of the problems but is limited because it is not zoned and therefore cannot perform multiple picks. If multiple picks are attempted then the first pick often fails due to leakage from the other open cups.

Therefore, there exists a need for an improved universal end effector that can be programmed to open vacuum flow to only selected zones of suction cups as required to form desired patterns or zones of suction. The end effector would minimize vacuum loss through suction cups that are not sealed over a product. Preferably, the end effector would have high enough resolution of suction cups to be able to form substantially any pattern for any common sized product to be picked and placed by a robot. The end effector would allow a high volume of vacuum flow to each suction cup that is to engage the work product substantially without loss of sub-atmospheric pressure in the vacuum source through the other suction cups, and without complex and restrictive chambers and multiple hoses.

SUMMARY DESCRIPTION

Briefly described, one form of the present process concerns a method of selectively robotically collecting work products in a selected pattern from an accumulation of work products and placing the work products in a receptacle. The method includes orienting an end effector to engage some of the work products in the accumulation of work products with a plurality of vacuum retrievers in a first zone of the vacuum retrievers, applying a sub-atmospheric air pressure to the vacuum retrievers in the first zone of vacuum retrievers while avoiding drawing an air pressure in the remaining vacuum retrievers, and retrieving work products from the accumulation of work products with the vacuum retrievers in the first zone of the end effector. Then re-orienting the end effector with respect to the accumulation of work products and re-engaging the accumulation of work products with a second zone of the vacuum retrievers. Sub-atmospheric air pressure is applied to the vacuum retrievers in both the first and second zones of vacuum retrievers, and the work products are retrieved with the vacuum retrievers in the second zone of the end effector. These steps may be repeated for several picks until the desired pattern of work products are gathered on the end effector. Then the end effector places the work products in registration with a receptacle, and the sub-atmospheric air pressure to the work products is terminated to release the work products from the end effector.

In another embodiment, the apparatus may include a robot with an end effector for retrieving work products in a selected pattern from an accumulation of work products and for placing the retrieved work products in the selected pattern in a receptacle. The end effector may comprise a vacuum plenum housing, an array of vacuum retrievers such as suction cups suspended from the vacuum plenum housing for engaging the work products. Air control means are connected to each vacuum retriever for applying a sub-atmospheric air pressure of the vacuum plenum housing to each of the vacuum retrievers that are to retrieve work products while avoiding the application of sub-atmospheric air pressure of the vacuum plenum to the vacuum retrievers that are not to retrieve the work products.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2A is an isometric view of the robot and its end effector of FIG. 1A, showing how some of the vacuum retrievers of the end effector have picked some of the work products.

DETAILED DESCRIPTION

Figure 1A:
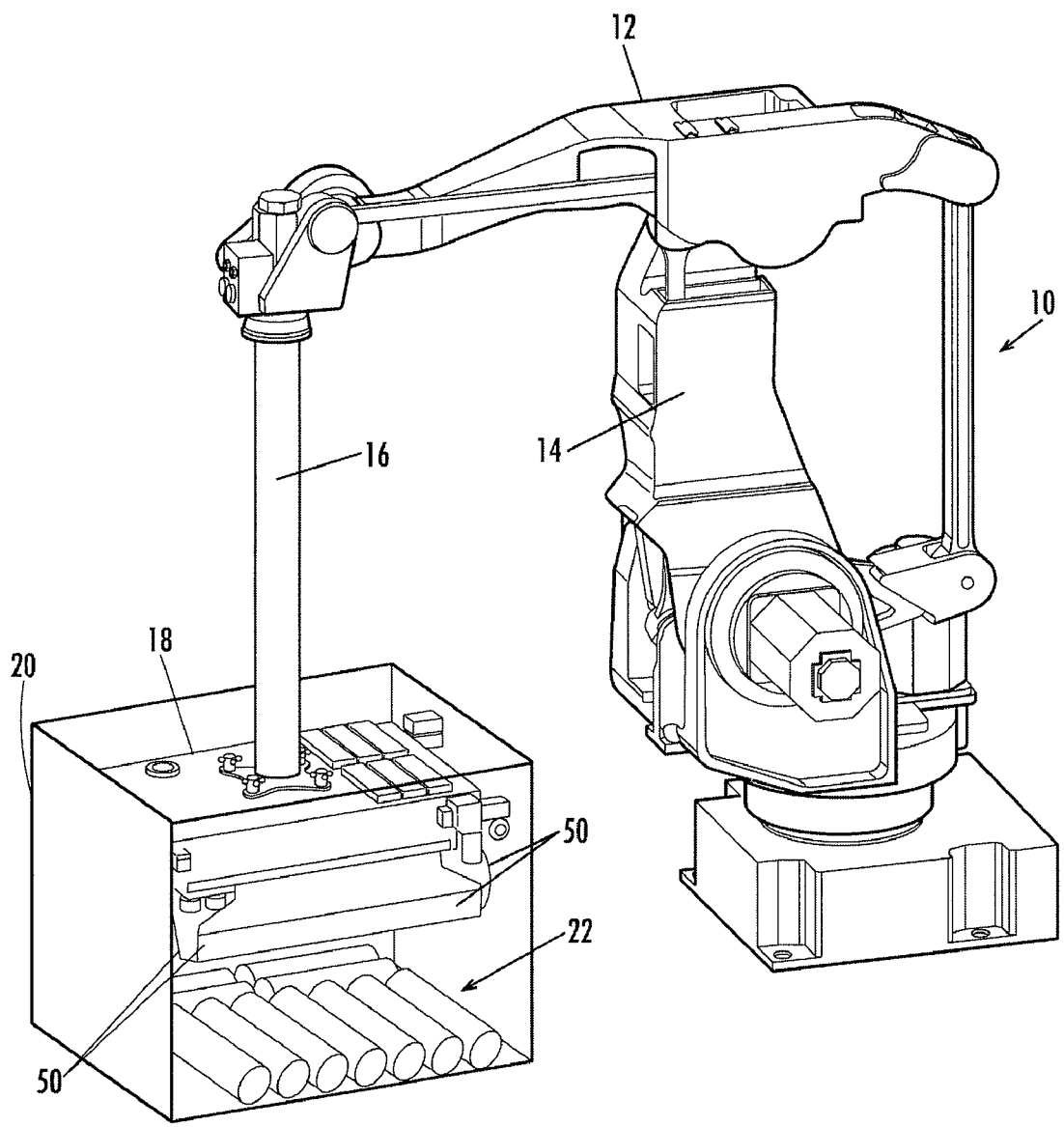
FIG. 1A is an isometric view of a robot and its vacuum assisted programmable zoned end effector and the standard receptacle for receiving the work product.

Referring now in more detail to the drawings, in which like numerals indicate like parts throughout the several views, FIG. 1A illustrates a robot 10 of conventional articulating design, being pivotal about and upright axis, having a rocker arm 12 mounted on a rotary stanchion 14, and control arm 16 that has the capacity to rotate in the distal end of the rocker arm 12. The end effector 18 is mounted to the distal end of the control arm 16 and its movements are controlled by a program entered in the robot's computer system. The end effector can be rotated, raised, lowered and moved in lateral directions, as is common in the art and in accordance with its programmable control system.

As shown in FIG. 1A, the end effector 18 has been placed in alignment with the receptacle 20 which is a packing container. The work products 22 have been released by the end effector 18 and have been deposited on the bottom wall of the receptacle 20. In the embodiment illustrated, the receptacle is a box-shaped item but may be a basket, tray, pallet, or various other receptacles or surfaces. For purposes of illustration, without restriction, the invention is disclosed herein as being an apparatus and product for packing loaves of bread 22, and the details of the invention are directed to that product.

FIG. 2A shows the robot 10 from a different perspective, showing the end effector 18 in a position that reveals the suction surface 19 of the end effector. The suction surface 19 includes an array of vacuum retrievers, such as the corrugated or "bellowed" suction cups 24 that are to be applied to and that are to pick the loaves of bread or other work product.

Figure 1B:
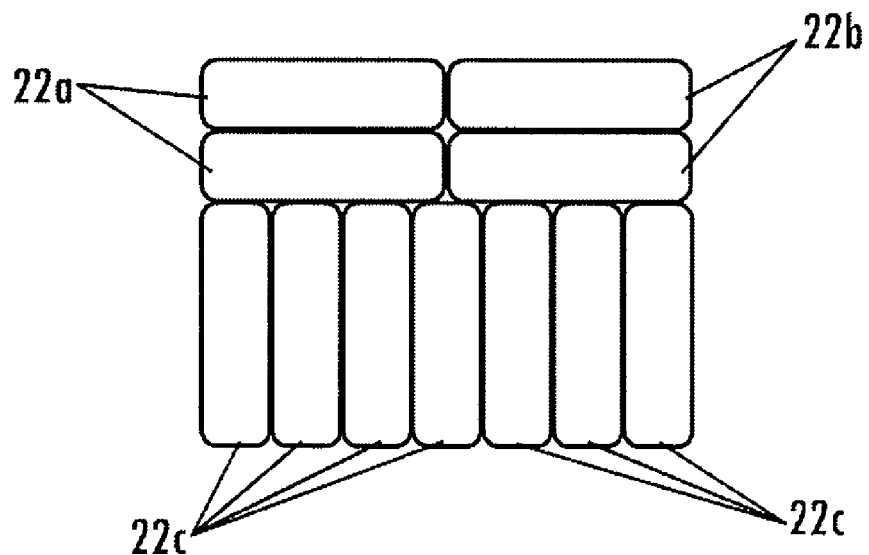
FIG. 1B is a diagram of a plan view of a desired configuration of the work product on the vacuum assisted zoned end effector as picked from an accumulation of the work products when to be delivered to a standard receptacle.
Figure 1C:
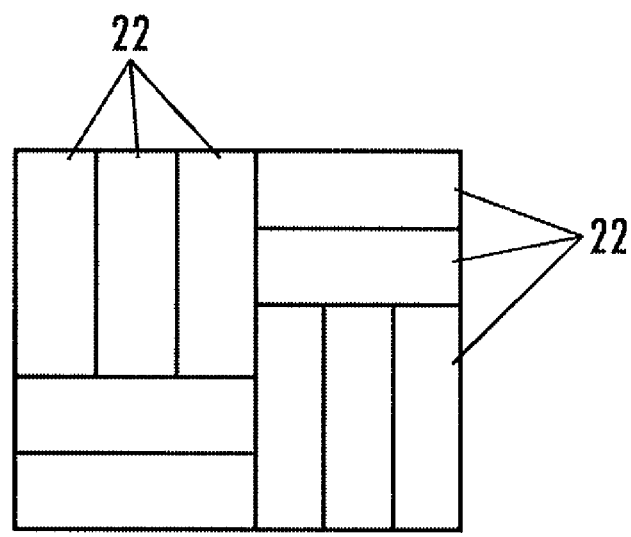
FIG. 1C is a diagram of another example of a desired configuration of the work product on the vacuum assisted zone end effector.

FIGS. 1B and 1C show sample arrangements of a layer of loaves of bread 22 when placed in a receptacle. A typical loaf of bread may be four inches wide and fourteen inches long, wrapped in a plastic film bag that has extra material gathered at one end to close about the end of the loaf. An example of the basket used by the producer to ship the loaves may have an inside dimension of twenty-two inches by twenty-eight inches.

The desired pattern for best fitting the most loaves of this size in this size basket is shown in FIG. 1B and is to have two loaves end-to-end on the twenty-eight inch dimension side of the basket. Next, another two loaves are placed end-to-end against the first two loaves. Finally seven loaves are turned perpendicular to the previous loaves so that their fourteen inch dimension fits the remaining fourteen inch available space in the basket. This allows eleven loaves per basket which is the most loaves possible for his size loaves in this size basket. If the loaves are of a different shape or size, or if the receptacle is of a different shape or size, the arrangement of the loaves is likely to change to better fit the dimensions of the receptacle.

The basket for the loaves in the arrangement of loaves of FIG. 1C may be of different dimensions or the loaves may be different in size from FIG. 1B, so the best arrangement of loaves 22 may be different. FIG. 1C shows a packing arrangement for 10 loaves.

Figure 2B:
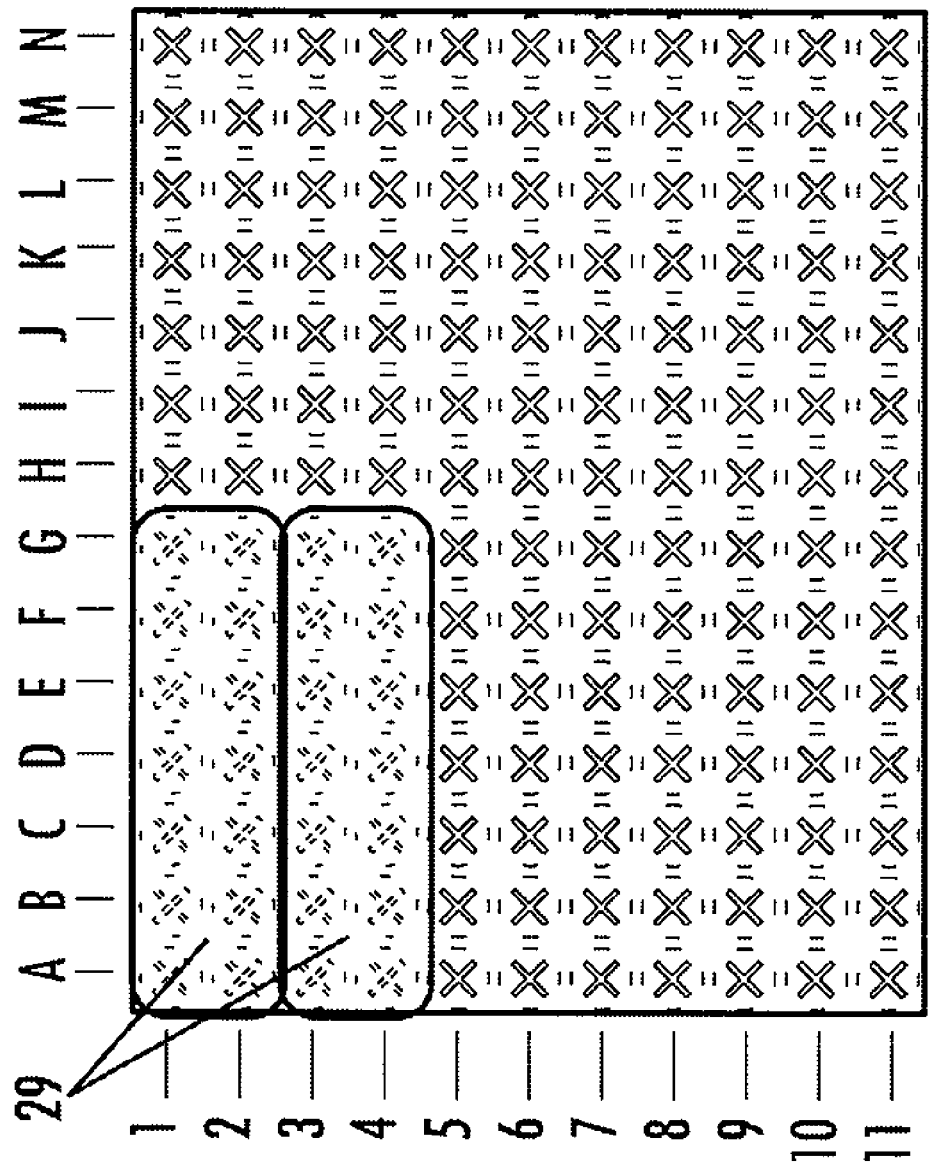
FIG. 2B is a diagram of the work products as picked by the end effector of FIG. 2A.

As shown in FIG. 2A, an array of suction cups 24 on the suction surface 19 of the end effector is formed in a rectangle, with the suction cups arranged in columns and lines. As shown in FIG. 2B, the suction cups are identified by columns and rows, with the columns identified as A-N and the rows identified as 1-11. It will be noted that FIG. 2B shows that the first pick 29 is of two loaves of bread 22A that occupy suction cups in columns A-G and rows 1-4.

When loaves of bread have been bagged in a bagging machine, they are moved on a surface conveyor 26 with their long dimension leading. The loaves are conveyed to the end of the surface conveyor against a stop 28 and are gathered at the stop in a side-by-side accumulation. Once several products accumulate, the robot may begin its picking functions.

An example of the picking steps is shown in FIGS. 3A-3D. In this example, the programmable end effector 18 moves from its rest position in FIG. 3A over to the accumulation of loaves 22 on the surface conveyor 26 as shown as shown by arrow a and rotates as shown by arrow b and moves down onto the two end loaves 22A at the stop 28 of the surface conveyor 26 and first picks loaves 22A at one corner of its suction surface 19. Suction is applied to suction cups the zone identified as 1A to 1G, 2A to 2G, 3A to 3G, and 4A to 4G. The end effector then holds the two loaves on its suction surface 19. When the first loaves 22A have been lifted away from the accumulation of loaves on the conveyor, the conveyor advances the accumulation of loaves to the conveyor stop 28. The robot then moves the end effector over as shown by arrow c and picks two more loaves 22B in alignment with the first two loaves 22A by again coming down over and retrieving the loaves. Suction is applied to suction cups in the zone identified as 1H to 1N, 2H to 2N, 3H to 3N, and 4H to 4N.

The end effector then holds all four loaves on its suction surface 19 and the surface conveyor again advances its accumulation of loaves to the end stop 28. The robot then rotates the end effector 90 degrees as shown by arrow d and moves the end effector over as shown by arrow e to place the empty portion of the suction surface over the loaves on the surface conveyor. The empty portion of the suction surface 19 then picks seven loaves 22C in side-by-side arrangement. Suction is applied to suction cups in the pick zone identified as columns 5-11 and columns A-N. All of the loaves are held on the suction surface of the end effector, and the robot moves the end effector into registration with the basket and releases the loaves into the basket.

Figure 4A:
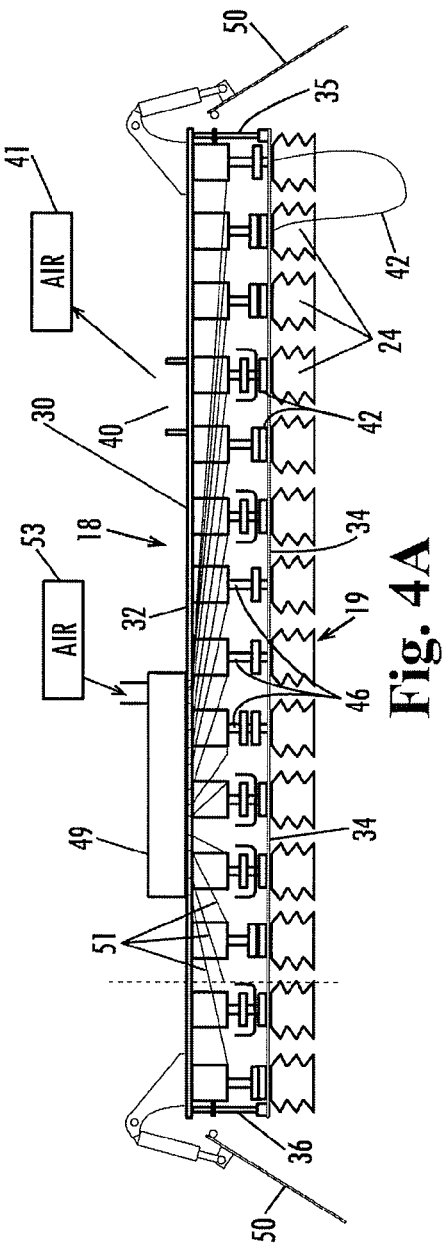
FIG. 4A is an end cross section of the end effector.
Figure 4B:
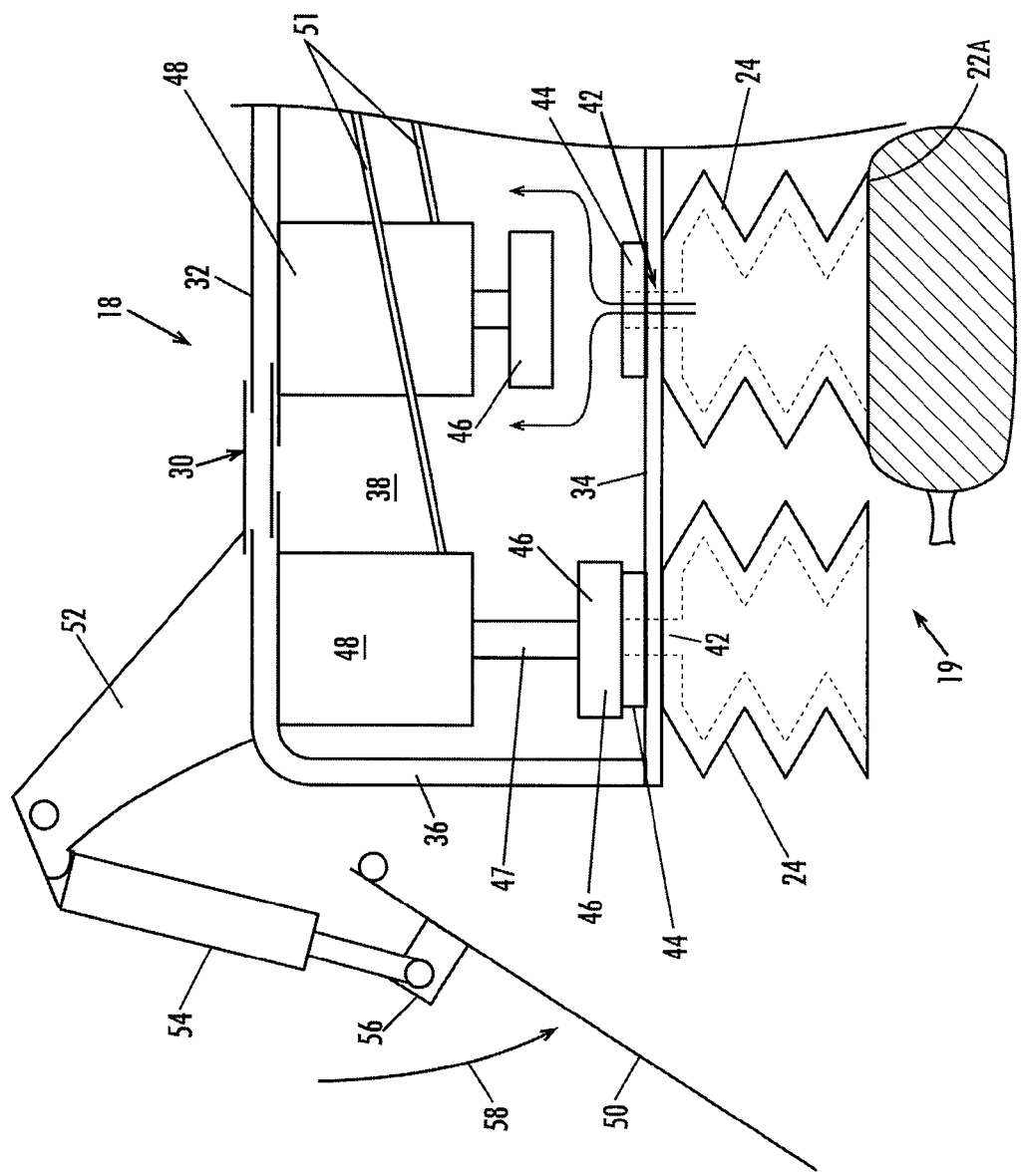
FIG. 4B is a detailed illustration of the end effector of FIG. 4A.

As shown in FIGS. 4A and 4B, the end effector 18 includes a vacuum plenum housing 30, with the housing including a top wall 32, a bottom wall 34, and four perimeter walls, such as perimeter walls 35 and 36. The walls of the housing 30 define a vacuum plenum 38 and an air outlet opening 40 on the top wall 32 is connected to the inlet of a compressor 41 that draws air from the plenum. The suction cups 24 are suspended from the bottom wall 34 of the vacuum plenum housing 30 for picking work products 22.

The bottom wall 34 of the plenum housing defines an array of air passages 42 over its length and width for the passage of air from below the bottom wall upwardly into the plenum chamber 38. Each suction cup 24 is mounted to the bottom wall 34 of the plenum chamber by conventional means, such as by the insertion of a washer in the upper corrugation of the suction cup, above the bottom wall 34 of the vacuum plenum housing 30, so that the upper ends of the suction cups are firmly and permanently held in place, with the middle and lower portions of the suction cups suspended downwardly from the bottom wall 34. With this arrangement, the air passage 42 extends from the internal area of the suction cup upwardly through the washer 44, into the vacuum plenum housing 30.

A plug 46 and a plug actuator 48 connected together by rod 47 are suspended from the top wall 32 over each air passage 42. Each plug 46 independently reciprocates between a lower position in which it engages and blocks the upper portions of its suction cup. This blocks the air passage 42, and prohibits the movement of air up through the hollow suction cup, through the air passage, and into the vacuum plenum 38. When air is allowed to be drawn from a suction cup up into the vacuum plenum housing 30, the plug actuator 48 retracts its plug 46 away from the washer 44, thereby opening the large and minimally restrictive passage 42. This supplies the sub-atmospheric pressure of the vacuum plenum 38 to the interior of the suction cup 24. If the suction cup has its bottom surfaces in engagement with a loaf of bread 22, the sub-atmospheric pressure of the vacuum plenum 38 is applied to the loaf of bread and the loaf of bread will cling to the suction cup and will be movable in unison with the end effector 18, as described above. Usually, the plugs will be closed and no air will flow through their suction cups when their suction cups are not being used to retrieve or hold a work product.

The plug actuator 48 may be driven by various power means, such as the application of pressure to a pneumatic cylinder 54, or by solenoid actuation, or other mechanical means suitable for this purpose. Preferably, a pneumatic actuation system is desired for weight, simplicity of design and durability.

A valve bank unit 49 containing a valve for each plug actuator is mounted on or near the vacuum plenum housing and each valve is connected to one of the plug actuators 48 for controlling pressurized airflow to predetermined ones of plug actuators 48. A conventional air pressure supply 53 is connected to the valve bank unit 49 for providing pressurized air through the valve bank unit to the conduits 51 leading from each valve of the valve bank unit to a fluid operated cylinder. The plug actuators 48 and valve bank unit 49 function as an air control means for operating the plugs 46.

When the end effector 18 has not engaged a loaf of bread but has been charged with sub-atmospheric air pressure, all of the plugs 46 will be in their down positions engaging the upper structural portion of the suction cups, thereby blocking the air passages 42. This prevents the dilution of the sub-atmospheric air pressure, maintaining the end effector in a charged condition, ready for picking the work product. Likewise, when the suction cups 24 in a predetermined zone of suction cups engage a work product for the purpose of picking the work product, the plugs 46 in the elected pick zone will be withdrawn from engagement with the air passage, allowing a stream of air to move from the suction cups up through the air passages 42. If the product is engaged by the lower portion of the suction cups of the selected pick zone, the suction cups will draw a sub-atmospheric air pressure against the work product, causing the work product to cling to and be carried away by the suction cups.

As described above, once the first pick has been accomplished and the loaves of bread 22A have been picked away from the accumulation of loaves at the delivery end of the surface conveyor, the vacuum plenum housing can be lifted, reoriented and reapplied to the accumulation of loaves, so that a different pick zone of suction cups 24 are applied to the accumulation of loaves, and the sub-atmospheric air pressure is created in the selected pick zone for the second pick of the work products.

Likewise, if subsequent picks are required, the process described above is repeated until the desired pattern of work products is accumulated by the suction cups of the end effector.

Because each suction cup is independently operated from the other suction cups, the user may prevent vacuum leakage through the suction cups that are not to engage a work product by closing the plugs 46 over the air passages 42 for any air passage whose underlying suction cup is not to fully engage with a work product 22. Also, should some of the suction cups fully engage a work product 22 and the user does not desire to pick up that particular work product, the corresponding plug 46 and plug actuator 48 remain closed so that no sub-atmospheric air pressure is communicated to the suction cup. This results in no lifting or picking of the work product engaged by the suction cup that is out of the zone that is to pick the work products.

In the example shown in FIGS. 4A and 4B, compressive surfaces 50 in the form of compression plates are mounted to the top wall 32 of the vacuum plenum housing 30 by support arm 52. Fluid operated cylinder 54 and its rod 55 are pivotally supported by the support arm 52 and a pivotal connection 56. When the fluid operated cylinder 54 expands to move its piston downwardly, the rod 55 moves the compression plates 50 downwardly and inwardly in the direction generally illustrated by arrow 58 so that the distal edges of the compression plates 50 become aligned with the perimeter walls and engage any surfaces of the work product that may be protruding laterally from beneath the suction cups 24. This tends to gather and compress the picked products laterally inwardly beneath the suction surface 19 of the end effector. Preferably, the compression plates 50 will move to a position with respect to one another that will fit downwardly into the basket 20 (FIG. 1A). Similar compression plates are disclosed in my U.S. Pat. No. 7,017,961.

Figure 5:
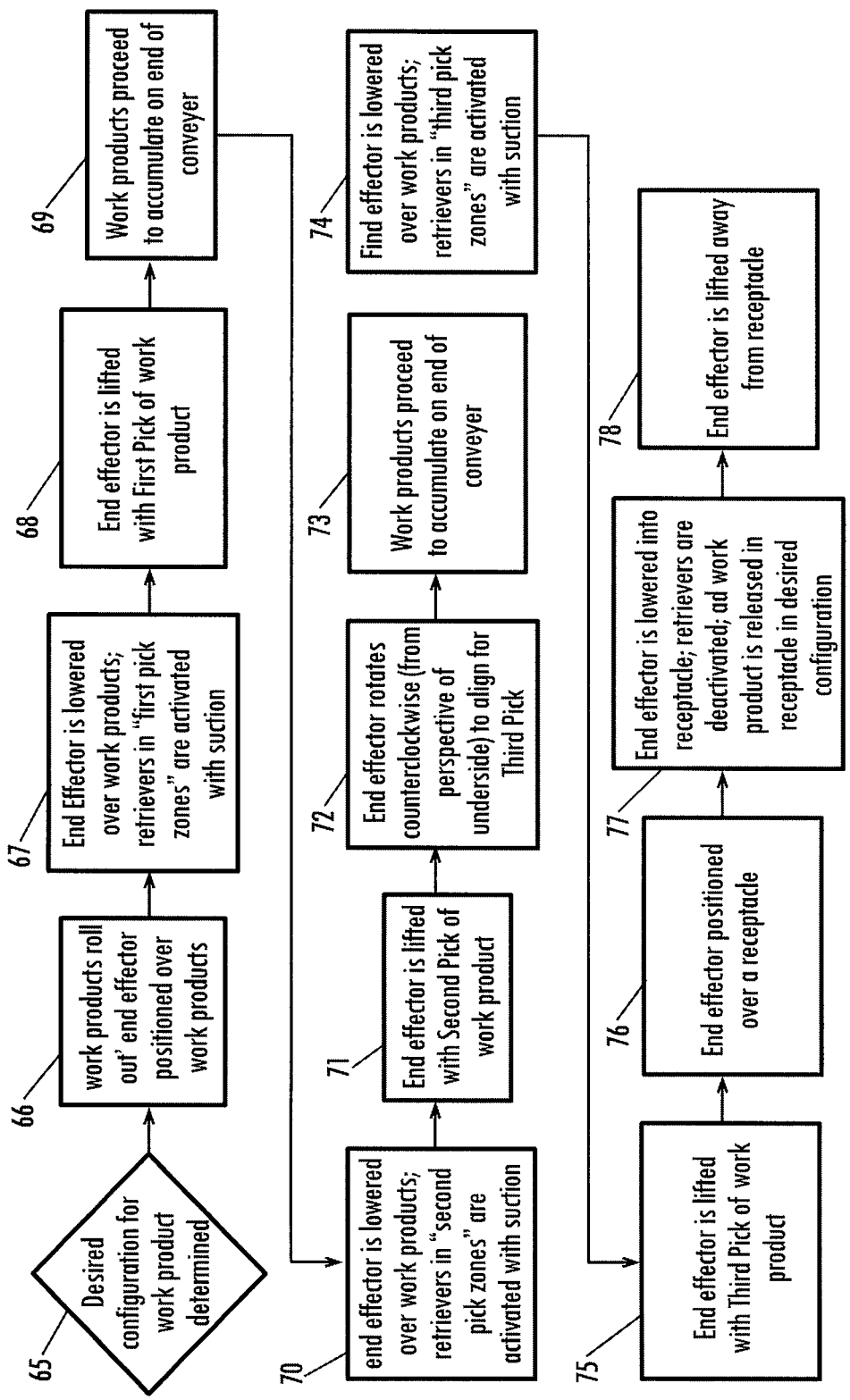
FIG. 5 is a block diagram of an example embodiment of a method of using the end effector of FIG. 1 to achieve a desired configuration of work products.

FIG. 5 is a flow chart depicting an example of a method of conducting multiple picks of bread loaves 22 with the end effector 18 and placing the retrieved bread loaves in a receptacle 20 in a desired configuration as shown in FIG. 1B. As shown in block 65 of the flow chart, a user first sets the motion control means, such as a conventional programmed computer, to choose the desired configuration of the zones that correspond to the packaging pattern for the bread loaves and the receptacle.

In block 66, bread loaves 22 are advanced by the surface conveyor 26 to its end stop 28 which is the position where the robot will place the end effector for picking the loaves. The end effector is moved to a position over the loaves at the end of the conveyor.

Figure 3A:
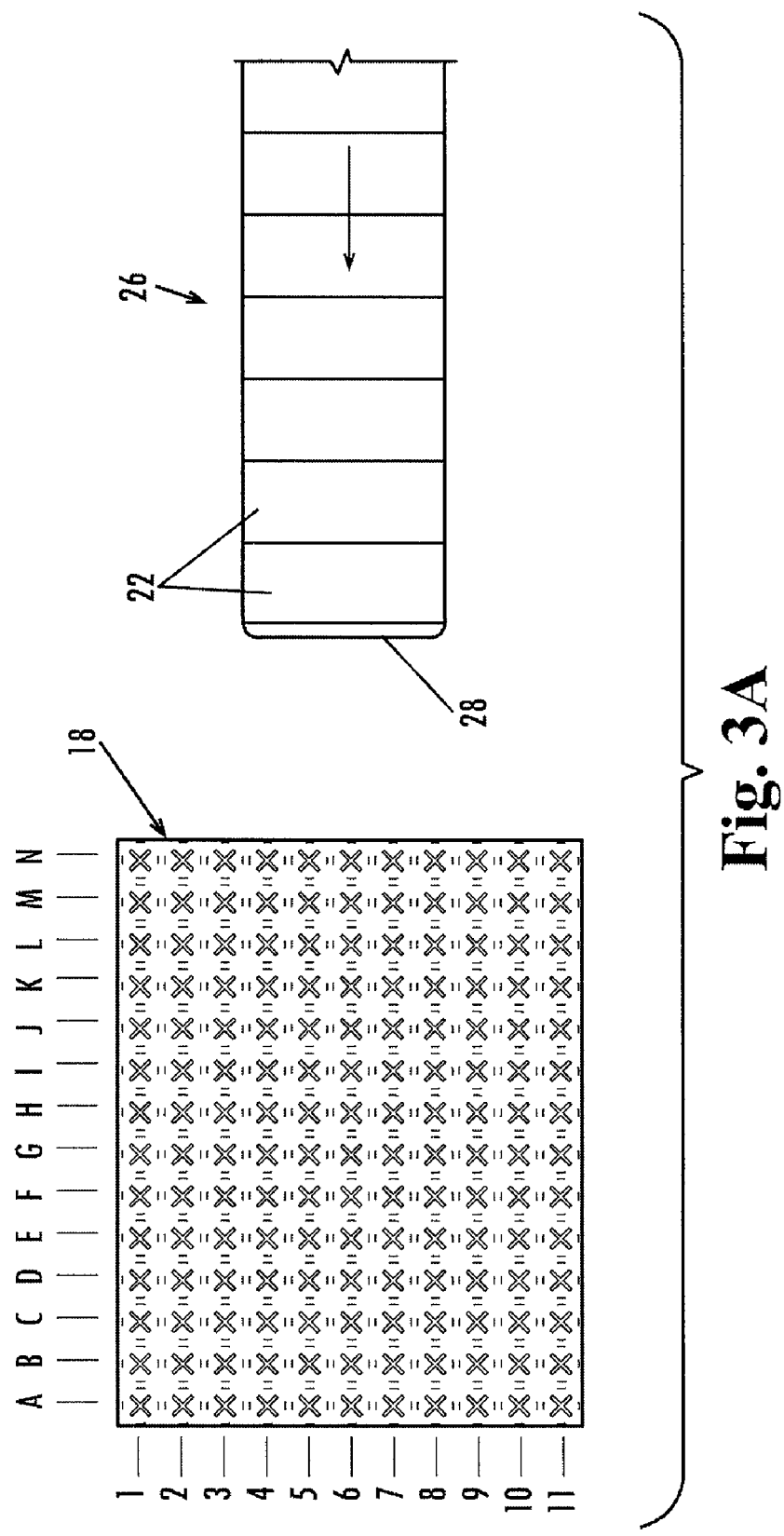
FIGS. 3A-3D are progressive illustrations of the vacuum face of the end effector, showing the pattern of the work products as they are progressively picked by the end effector.
Figure 3B:
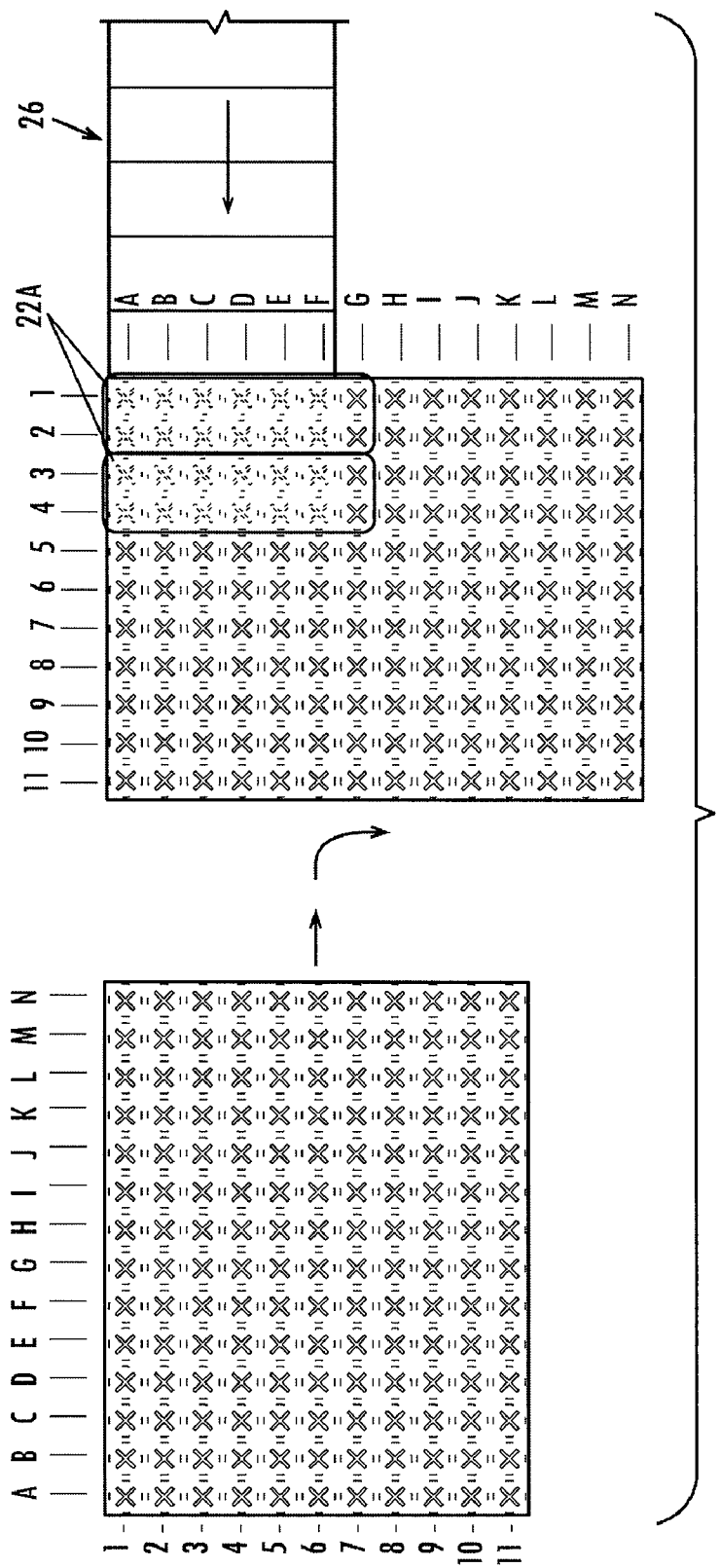

In blocks 67 and 68, the end effector 18 is lowered so that the suction cups in the first pick zone engage the loaves as illustrated in FIG. 3B, and upon activation of the suction cups, bread loaves 22A are picked and the end effector 18 is lifted with the loaves 22A in the first pick zone.

Figure 3C:
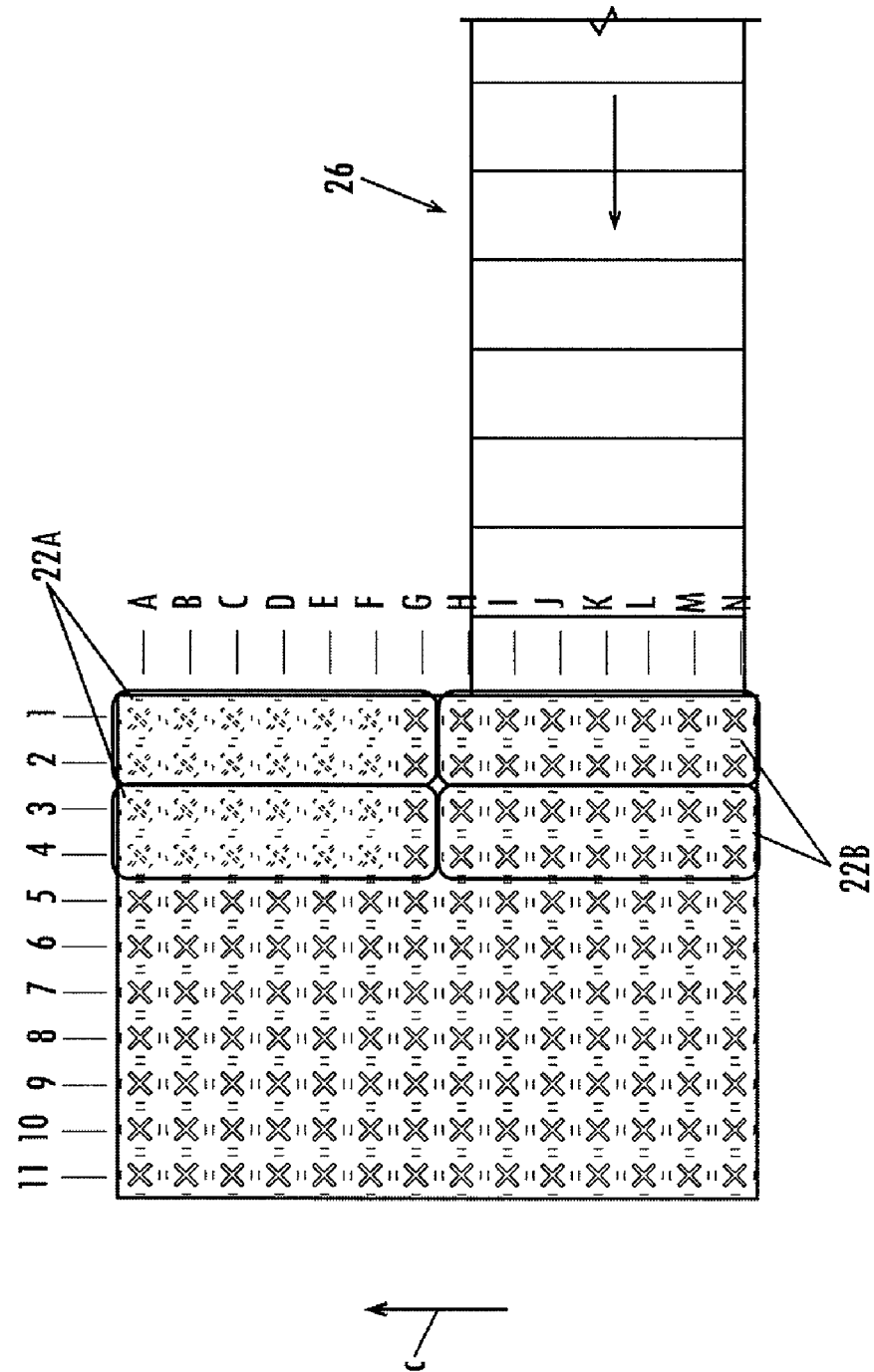
Figure 3D:
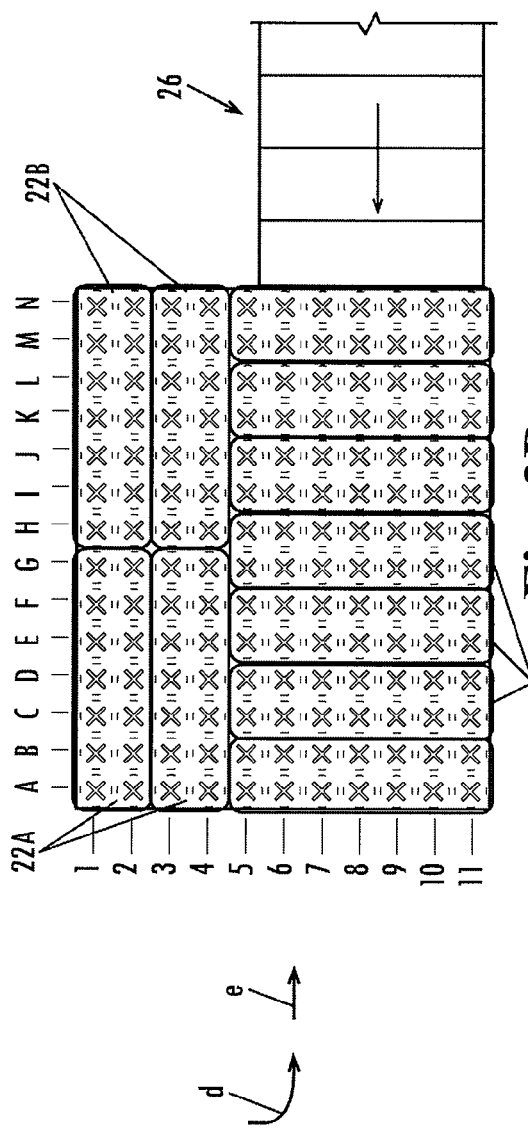

In blocks 69 and 70 of FIG. 5, bread loaves 22 proceed to accumulate at the end stop 28 of surface conveyor 26, and the end effector 18 is shifted as indicated by FIG. 3C so that its second pick zone of suction cups will be lowered to retrieve and then lift the second pick of loaves 22B.

In blocks 71 and 72 of FIG. 5, the end effector 18 is lifted and reoriented so that its third pick zone of suction cups will be aligned over the remaining loaves 22C. In the meantime, block 73 shows that the loaves on the surface conveyor 26 will be advanced to the end stop 28, at the desired position for being picked.

As indicated in block 74, the end effector is lowered so that its third pick zone of suction cups is positioned over the work products at the end of the surface conveyor and the suction cups in this zone are activated so as to retrieve the remaining loaves.

Now that all of the pick zones of the end effector are occupied by loaves 22, block 75 shows that the end effector is lifted, with all of the pick zones of suction cups retrieving the loaves, including loaves 22C (FIG. 3C).

As shown in block 76, the end effector is positioned over the receptacle, and in block 77 the end effector is lowered into registration with the basket or other receptacle, the suction cups are deactivated by opening the vacuum plenum housing 30 to the atmosphere which equalizes the air pressure from inside to the outside of the suction cups, thereby releasing the loaves inside the basket 20 (FIG. 1A).

At this point, the end effector is lifted away from the receptacle and returned to its ready position, as shown by block 78.

The array of suction cups 24 is made in a dense pattern so that there will be a suction cup present in all positions that might engage a loaf of bread. There may be some instances where some of the suction cups in a pick zone are not actuated by forming a sub-atmospheric air pressure therein. The suction cups in a zone that are likely not to be used would be those that are to be placed at the adjacent edges of the work product, where the open ends of the suction cups may not become sealed against the work products. This unsealed situation may allow excessive air to enter through the open-ended suction cups into the vacuum plenum chamber, thereby depleting the vacuum in the chamber. This avoids the depletion of the vacuum in the chamber by inadvertently open suction cups. In the meantime, other suction cups in the pick zone would engage and lift the work products.

While this invention is disclosed as picking work products to fit within a basket or container, the invention may be used to place work products in or on other items that are not limited to a particular size or shape. Also, a layer of products in a particular pattern could be lifted all at once from a container and sequentially placed in a different reference configuration for the purpose of conveying the products away in a referenced configuration.

Although a preferred embodiment of the invention has been disclosed in detail herein, it will be obvious to those skilled in the art that variations and modifications of the disclosed embodiment can be made without departing from the spirit and scope of the invention as set forth in the following claims.

Therefore, having thus described the invention, at least the following is claimed:

1. An end effector for retrieving work products in sequential picks from an accumulation of work products, with the retrieved work products placed in different orientations on an array of vacuum retrievers of the end effector and for placing the retrieved work products in a selected pattern in a receptacle, the end effector comprising:
   a vacuum plenum housing for maintaining a sub-atmospheric pressure,
   the array of vacuum retrievers in communication with the vacuum plenum housing for engaging the work products,
   means for selecting a zone of the vacuum retrievers,
   an air control means connected to each of the vacuum retrievers for applying the sub-atmospheric air pressure of the vacuum plenum housing to each of the vacuum retrievers in the selected zone of the vacuum retrievers that are to retrieve the work products, while avoiding an application of the sub-atmospheric air pressure of the vacuum plenum housing to the vacuum retrievers that are in engagement with the work products and are not in the selected zone of the vacuum retrievers and for accumulating the work products in the different orientations on said vacuum retrievers.

2. The end effector of claim 1, wherein the vacuum retrievers are corrugated suction cups.

3. The end effector of claim 1, and further including
   a robot connected to the end effector for moving said end effector into predetermined attitudes with respect to the accumulation of work products to gather the work products from the accumulation of the work products in the different orientations on the vacuum retrievers.

4. The end effector of claim 1, wherein said vacuum plenum housing further comprises:
   an outer perimeter;
   compressive surfaces mounted along said outer perimeter positionable for lateral compression of said work products retrieved on said vacuum plenum housing.

5. The end effector of claim 1, wherein said vacuum plenum housing defines an array of air passages, each of said air passages positioned for forming an air flow between the vacuum retrievers and the vacuum housing.

6. The end effector of claim 5, wherein said air control means further comprises:
   a plurality of air-pressurized plug actuators, each of said plug actuators aligned over one of said air passages and including a valve stem, and
   a plurality of plug members, each of said plug members attached to one of said valve stems and configured for closing one of said air passages upon selective extension of said valve stem.

7. The end effector of claim 1, wherein said air control means comprises plugs each independently positionable for opening and closing air flow between the vacuum plenum housing and selected ones of the vacuum retrievers.

8. The end effector of claim 7 wherein said air control means further comprises a plug actuator for each of said plugs for selectively extending and retracting said plugs for closing and opening selected ones of said air passages.

9. The end effector of claim 8, wherein said air control means further comprises a valve bank unit mounted on said vacuum plenum housing and connected to each of said plug actuators for controlling pressurized airflow to selected ones of the plugs.

10. The end effector of claim 9, further comprising means for connecting said valve bank unit to a pressurized air supply.

11. The end effector of claim 1, wherein each of said vacuum retrievers comprises:

a suction cup configured for contracting in response to engagement by the suction cup against one of said work products, the suction cup including an open distal end and a proximal end comprising a valve seat.

12. The end effector of claim 1, and further including compressive surfaces movably mounted to said vacuum plenum for laterally pushing together the work products retrieved by the actuator.

13. An end effector for a robot for retrieving work products on the end effector in a selected pattern in sequential picks from an accumulation of work products with the retrieved work products placed in different orientations with respect to one another on the end effector and for placing the retrieved work products in a selected pattern in a receptacle, the end effector comprising:

a vacuum plenum housing for containing a sub-atmospheric air pressure, the array of vacuum retrievers suspended from the vacuum plenum housing for engaging the work products, air control means for applying the sub-atmospheric air pressure of said vacuum source to less than all of said vacuum retrievers that are in engagement with said accumulated array of work products for selecting a zone of the vacuum retrievers and individually applying a sub-atmospheric air pressure of the vacuum plenum housing to each of the vacuum retrievers in the selected zone of the vacuum retrievers and for blocking the sub-atmospheric air pressure of the vacuum plenum housing from the vacuum retrievers in engagement with the work products not in the selected zone of the vacuum retrievers, and for picking the work products in the selected zone, while avoiding picking the work products engaged by the vacuum retrievers not in the selected zone of the vacuum retrievers.

14. An end effector for retrieving work products in a selected pattern from an accumulated array of work products and for placing the retrieved work products in the selected pattern in a receptacle, said end effector comprising:

a vacuum source for maintaining a sub-atmospheric air pressure, an array of vacuum retrievers for engaging the work products, means for applying the array of vacuum retrievers to the accumulated array of work products, valve means for applying the sub-atmospheric air pressure of said vacuum source to less than all of said vacuum retrievers that are applied to said accumulated array of work products.

15. The end effector of claim 14, wherein said vacuum retrievers comprise bellowed suction cups, said valve means for applying the sub-atmospheric air pressure of said vacuum source to less than all of said vacuum retrievers that are applied to said accumulated array of work products comprises a plug for selectively blocking the application of the sub-atmospheric air pressure to said suction cups.

16. The end effector of claim 14, wherein said valve means for applying the sub-atmospheric air pressure of said vacuum plenum to less than all of said vacuum retrievers comprises:

a plurality of air control means, wherein each of the air control means is connected to one of said vacuum retrievers and is constructed for blocking the application of the sub-atmospheric air pressure of the vacuum plenum housing to the vacuum retrievers.

* * * * *